US011487742B2

(12) United States Patent
Packirisamy

(10) Patent No.: US 11,487,742 B2
(45) Date of Patent: Nov. 1, 2022

(54) CONSISTENCY CHECKS BETWEEN DATABASE SYSTEMS

(71) Applicant: SAP SE, Walldorf (DE)

(72) Inventor: Gopu Packirisamy, Kuthalam (IN)

(73) Assignee: SAP SE, Walldorf (DE)

( * ) Notice: Subject to any disclaimer, the term of this patent is extended or adjusted under 35 U.S.C. 154(b) by 1079 days.

(21) Appl. No.: 16/135,879

(22) Filed: Sep. 19, 2018

(65) Prior Publication Data

US 2020/0089792 A1 Mar. 19, 2020

(51) Int. Cl.
*G06F 16/00* (2019.01)
*G06F 16/23* (2019.01)
(Continued)

(52) U.S. Cl.
CPC .......... *G06F 16/2365* (2019.01); *G06F 16/21* (2019.01); *G06F 16/24565* (2019.01)

(58) Field of Classification Search
CPC ........ G06F 16/20; G06F 16/21; G06F 16/951; G06F 3/0481; G06F 3/0484; G06F 7/00; G06F 16/284; G06F 11/2097; G06F 16/00; G06F 2201/80; G06F 11/2071; G06F 16/26; G06F 16/9535; G06F 16/2365; G06F 16/2423; G06F 21/55; G06F 2201/84; G06F 11/0751; G06F 11/1004; G06F 11/1438; G06F 11/1441; G06F 11/1458; G06F 11/1466; G06F 11/2056; G06F 16/2308; G06F 16/2379; G06F 16/252; G06F 16/273; G06F 16/9014; G06F 21/31; G06F 21/568; G06F 21/575; G06F 21/6245; G06F 2201/82; G06F 9/4406; G06F 9/4418; G06F 11/1464; G06F 11/07; G06F 1/28;
(Continued)

(56) References Cited

U.S. PATENT DOCUMENTS 6,957,221 B1 * 10/2005 Hart ................... G06F 11/2097
2017/0091184 A1 * 3/2017 Bender ................. G06F 16/284

OTHER PUBLICATIONS

"All About Transport Request," retrieved from https://blogs.sap.com/2016/02/17/all-about-transport-request/, on or before Sep. 2018, 11 pages.
(Continued)

*Primary Examiner* — Shyue Jiunn Hwa
(74) *Attorney, Agent, or Firm* — Klarquist Sparkman, LLP

(57) ABSTRACT

Techniques and solutions are described for determining whether an update to be sent to a production database system from a quality database system will provide consistent table relationships if applied at the production database system. These consistency checks can be carried out without transmitting entire table records from the quality system to the production system, which can reduce network traffic. These consistency checks can also reduce performance impacts at the production system, as test condition generation can be carried out at the quality database system. A consistency check method can include the quality database system determining values of updated or added records of a first table that should be consistent with a second table. The test conditions cause the production database system to execute a test to determine whether the values are present in the production system. Consistency violations can be remedied before the update is applied.

20 Claims, 9 Drawing Sheets

(51) Int. Cl.
G06F 16/21 (2019.01)
G06F 16/2455 (2019.01)

(58) Field of Classification Search
CPC ............ G06F 11/1446; G06F 11/3006; G06F 11/3034; G06F 11/3495; G06F 11/14; G06F 11/3037; G06F 11/328; G06F 12/0804; G06F 12/0813; G06F 12/0868; G06F 12/0897; G06F 16/128; G06F 16/184; G06F 16/185; G06F 16/434; G06F 2009/45583; G06F 2009/45595
See application file for complete search history.

(56) References Cited

OTHER PUBLICATIONS

"Changing Parameters for the Transport Control Program," retrieved from https://help.sap.com/saphelp_nw73ehp1/helpdata/en/1e/080c6401b011d284870000e8a57770/frameset.htm, on or before Sep. 2018, 1 page.

"File Structure for tp," retrieved from https://help.sap.com/saphelp_tm81/helpdata/en/3d/ad5c374ebc11d182bf0000e829fbfe/frameset.htm, on or before Sep. 2018, 2 pages.

"Logging," retrieved from https://help.sap.com/saphelp_nw70/helpdata/en/e2/75a74046033913e10000000a155106/content.htm?no_cache=true, on or before Sep. 2018, 4 pages.

"SAP Basis—Transport Logs," retrieved from https://www.tutorialspoint.com/sap_basis_online_training/sap_basis_transport_logs.asp, on or before Sep. 2018, 2 pages.

"SAP R/3 Black Book—Google®," Module I: Chapter 11, retrieved from https://books.google.com/books?id=LDyarcerUu0C&pg=PA290&lpg=PA290&dq=sap+transport+foreign+key+check&source=bl&ots=v17f_Ofjtq&sig=2gh_EVrfjV6wqNm-Qb32Cw14jIQ&hl=en&sa=X&ved=2ahUKEwje6JCdyd7cAhU0HjQIHaktBbwQ6AEwAnoECAgQAQ#v=onepage&q=sap%20transport%20foreign%20key%20check&f=false, on or before Sep. 2018, 1 page.

"SAP TMS (Transport Management System) Tutorial," retrieved from https://www.guru99.com/transport-management-system-tms.html, on or before Sep. 2018, 11 pages.

"STMS Transport Management System to Display Transport Logs and Errors," retrieved from http://www.kodyaz.com/sap-abap/stms-transport-management-system-logs-for-errors.aspx, on or before Sep. 2018, 4 pages.

"Transport (SAP)," retrieved from https://en.wikipedia.org/wiki/Transport_(SAP), on or before Sep. 2018, 2 pages.

"Transport Management System—Concept," retrieved from https://help.sap.com/saphelp_me60/helpdata/en/c4/6045377b52253de10000009b38f889/content.htm?no_cache=true, on or before Sep. 2018, 3 pages.

"Transport Profile," retrieved from https://help.sap.com/saphelp_nw73ehp1/helpdata/en/3d/ad5b9b4ebc11d182bf0000e829fbfe/content.htm?no_cache=true, on or before Sep. 2018, 3 pages.

"Use of foreign key check in ABAP reports," retrieved from https://archive.sap.com/discussions/thread/1434238, on or before Sep. 2018, 5 pages.

Chandak, Komal, "Transport Request details in tabular format," retrieved from https://blogs.sap.com/2013/10/16/transport-request-details-in-tabular-format/, on or before Sep. 2018, 14 pages.

Chollangi, Ashik, "What is the difference between SAP production and SAP Quality?," retrieved from https://www.quora.com/What-is-the-difference-between-SAP-production-and-SAP-Quality, on or before Sep. 2018, 5 pages.

Donepudi, Satyasuresh, "To Find CTS transport requests and tasks details," retrieved from https://wiki.scn.sap.com/wiki/display/Snippets/To+Find+CTS+transport+requests+and+tasks+details, on or before Sep. 2018, 6 pages.

Kaglik, Dmitry, "SAP Transport System Explained (For Dummies)," retrieved from https://www.sapexpert.co.uk/sap-transport-system-explained/, on or before Sep. 2018, 5 pages.

Kösegi and Nerding, "SAP® Change and Transport Management," retrieved from https://www.thali.ch/files/Shop/Documents/013744_Leseprobe.pdf, on or before Sep. 2018, 107 pages.

* cited by examiner

| Constrained table | Record Key | Field Name | Field Value | Constraining Table | Condition |
|---|---|---|---|---|---|
| 208 | 1000 \| ABC | F1 | 1000 | 220 | A1 = '1000' |
| 208 | 1000 \| XYZ | F1 | 1000 | 220 | A1 = '1000' |
| 208 | 1001 \| ABC | F1 | 1001 | 220 | A1 = '1001' |
| 208 | 1001 \| STU | F1 | 1001 | 220 | A1 = '1001' |
| 208 | 1001 \| XYZ | F1 | 1001 | 220 | A1 = '1001' |
| 208 | 1000 \| ABC | F2 | ABC | 222 | B1 = 'ABC' |
| 208 | 1000 \| XYZ | F2 | XYZ | 222 | B1 = 'XYZ' |
| 208 | 1001 \| ABC | F2 | ABC | 222 | B1 = 'ABC' |
| 208 | 1001 \| STU | F2 | STU | 222 | B1 = 'STU' |
| 208 | 1001 \| XYZ | F2 | XYZ | 222 | B1 = 'XYZ' |
| 208 | 1000 \| ABC | F4 | 10 | 224 | C1 = '1000' AND C2 = '001' AND C3 = '10' |
| 208 | 1000 \| XYZ | F4 | 10 | 224 | C1 = '1000' AND C2 = '001' AND C3 = '10' |
| 208 | 1001 \| ABC | F4 | 10 | 224 | C1 = '1001' AND C2 = '001' AND C3 = '10' |
| 208 | 1001 \| STU | F4 | 10 | 224 | C1 = '1001' AND C2 = '001' AND C3 = '10' |
| 208 | 1001 \| XYZ | F4 | 10 | 224 | C1 = '1001' AND C2 = '001' AND C3 = '10' |

FIG. 2B

| Constraining Table | Condition |
|---|---|
| 220 | A1 = '1000' |
| 220 | A1 = '1001' |
| 220 | A1 = '1001' |
| 222 | B1 = 'ABC' |
| 222 | B1 = 'XYZ' |
| 222 | B1 = 'STU' |
| 224 | C1 = '1000' AND C2 = '001' AND C3 = '10' |
| 224 | C1 = '1001' AND C2 = '001' AND C3 = '10' |

| Constraining Table | Condition | Result |
|---|---|---|
| 220 | A1 = '1000' | TRUE |
| 220 | A1 = '1001' | TRUE |
| 220 | A1 = '1001' | TRUE |
| 222 | B1 = 'ABC' | TRUE |
| 222 | B1 = 'XYZ' | TRUE |
| 222 | B1 = 'STU' | TRUE |
| 224 | C1 = '1000' AND C2 = '001' AND C3 = '10' | TRUE |
| 224 | C1 = '1001' AND C2 = '001' AND C3 = '10' | FALSE |

FIG. 2C

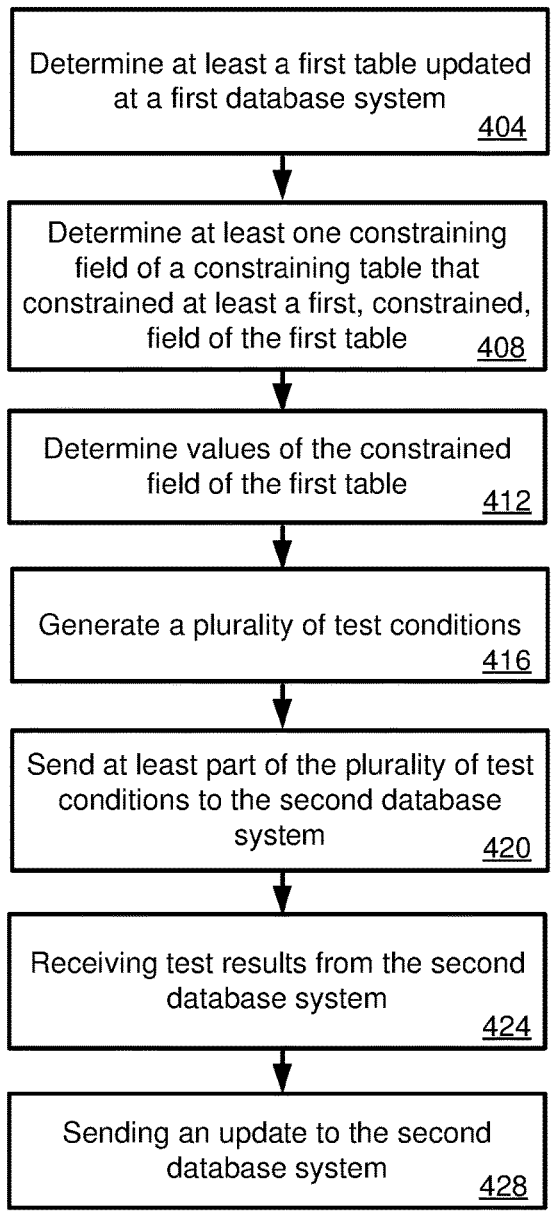
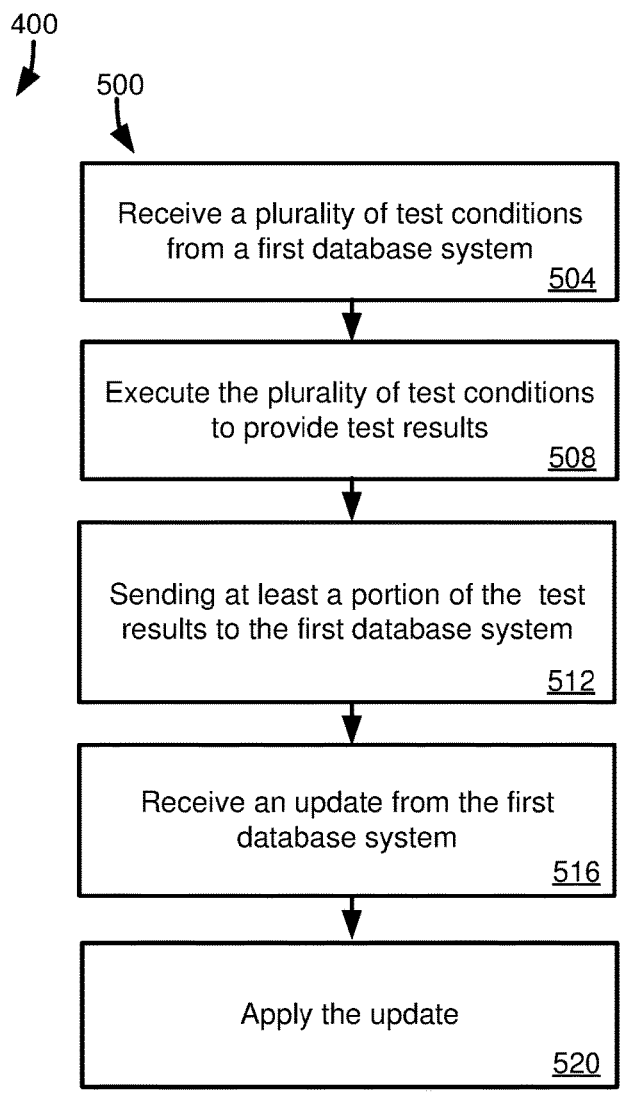
FIG. 4
FIG. 5

CONSISTENCY CHECKS BETWEEN DATABASE SYSTEMS

FIELD

The present disclosure generally relates to analyzing relationships between data in a database. Particular implementations relate to checking whether related data is consistent.

BACKGROUND

Database systems are increasingly complex. A database schema typically includes normalized tables, a significant portion of which can be interrelated. For example, a first database table may have a field that has a foreign key relationship with a second database table. Values for the foreign key field in the first table may only be valid if such values exist in the second database table. In part because of database complexity, changes to database schemas, or values (e.g., records) stored using the schema, are often made in a quality system before being transferred to a production system. However, determining whether foreign key relationships will be appropriate in the production system can be time consuming and resource intensive. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for determining whether an update to be sent to a production database system from a quality database system will provide consistent table relationships if applied at the production database system. These consistency checks can be carried out without transmitting entire table records from the quality system to the production system, which can reduce network traffic. These consistency checks can also reduce performance impacts at the production system, as test condition generation can be carried out at the quality database system. A consistency check method can include the quality database system determining values of updated or added records of a first table that should be consistent with a second table. The test conditions cause the production database system to execute a test to determine whether the values are present in the production system. Consistency violations can be remedied before the update is applied.

In one embodiment, a method is provided that can be carried out by a first database system to perform a consistency check with respect to a second database system. At least a first table updated at the first database system is determined. The first table is a constrained table. At least one field of a constraining table is determined that constrains at least a first field, a constrained field, of the at least a first table. Values of the constrained field in records of the at least a first table are determined. A plurality of test conditions are generated for at least unique values of the determined values. The plurality of test conditions are sent to the second database system. Test results are received from the second database system. An update is sent from the first database system to the second database system based at least in part on the received test results. The update includes at least a portion of the values of the at least a first table.

In another embodiment, a method is provided that can be carried out by a second database system to perform a consistency check with respect to an update associated with a first database system. A plurality of test conditions are received by the second database system from the first database system. A test condition specifies at least one constraining table, at least one constraining field of the at least one constraining table, and at least one value for the at least one constraining field. The first database system does not send with the test condition values of a constrained table of the first database system that are not used in a test condition.

The plurality of test conditions are executed to produce test results, the test results indicating whether the plurality of test conditions succeeded or failed. At least a portion of the test results are sent from the second database system to the first database system. An update is received from the first database system, where the update includes at least one update value referencing a test value associated with at least one of the plurality of test conditions (e.g., the update includes a record having a foreign key value that referenced a primary key value of the second database system, the primary key value being tested for earlier during execution of the test condition). The update is applied, including, for a table of the second database system, adding or modifying at least one table value with the update value.

In a further embodiment, a method is provided that can be carried out by a first database system and a second database system to perform a consistency check. At the first database system, at least a first table to be updated at the first database system is determined. The at least a first table is a constrained table. At least a first constraining field of a constraining table that constrains at least a first field, a constrained field, of the at least a first table is determined. A plurality of test conditions are generated, at least for unique values of the determined values. At least a portion of the test conditions are sent by the first database system to the second database system.

At the second database system, a plurality of test conditions are received from the first database system. A test condition specifies at least one constraining table, at least one constraining field of the at least one constraining table, and at least one value for that at least one constraining field. The first database system does not send with the test condition values of a constrained table of the first database system that are not used in a test condition. The plurality of test conditions are executed to produce test results, indicating whether the plurality of tests succeeded or failed. At least a portion of the test results are sent to the first database system.

At the first database system, test results are received from the second database system. One or more changes are made to an update to be sent to the second database system based at least in part on the test results. The update is sent to the second database system, where the update includes at least one update value referencing a test value associated with at least one of the plurality of test conditions. At the second database system, the update is received from the first database system. The update is applied, which includes, for a table of the second database system, adding or modifying at least one table value with the update value.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIGS. 2A-2C illustrate example data structures that can be used in determining whether changes to a database system may result in inconsistencies.

FIG. 4 is a flowchart illustrating operations that can be carried out by a first database system to determine if updates would be consistent if applied at a second database system.

FIG. 5 is a flowchart illustrating operations that can be carried out by a second database system to determine the consistency of an update to be sent by a first database system.

DETAILED DESCRIPTION

Example 1

Overview

Figure 1:
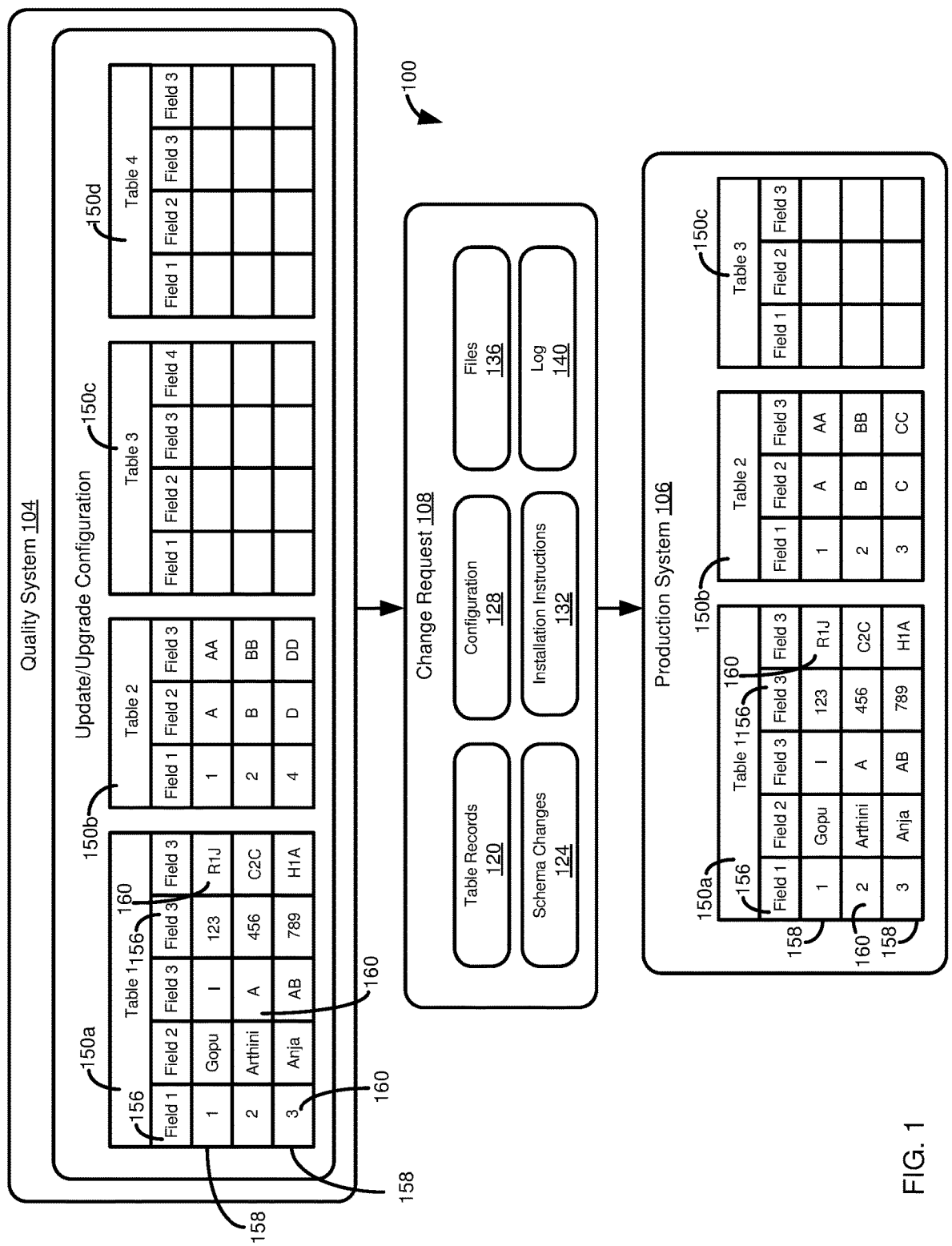
FIG. 1 is an example database environment illustrating how a change request may be made from a first database system, such as a quality system, to a second database system, such as a production system.

Database systems are increasingly complex. A database schema typically includes normalized tables, a significant portion of which can be interrelated. For example, a first database table may have a field that has a foreign key relationship with a second database table. Values for the foreign key field in the first table may only be valid if such values exist in the second database table. In part because of database complexity, changes to database schemas, or values (e.g., records) stored using the schema, are often made in a quality system before being transferred to a production system. However, determining whether foreign key relationships will be appropriate in the production system can be time consuming and resource intensive. Accordingly, room for improvement exists.

In some cases, consistency checks for a change in a database schema, or values stored using the schema, can be performed when the changes are imported into the production system. The entire production system, or a relevant portion (e.g., tables associated with schema or value changes) can be rendered unavailable until an update, upgrade, or similar change is made. Or, at least, the updated or upgraded system is not available until the consistency checks are carried out and any identified problems are resolved.

Attempts to run consistency checks prior to importing an update from the quality system to the production system can also suffer various drawbacks. For example, update information, including schema changes and table records, can be sent from the quality system to the production system. Consistency checks can then be performed at the production system before an import process is initiated. However, this approach is still resource intensive.

Sending update data from the quality system to the production system can be resource intensive, including sending duplicate data, in some cases (e.g., sending the data once for the check and then again for the update). Or, resource use can be wasted if data is sent, problems identified, and data then resent after any problems are addressed. Computing resources are also typically used when the results of consistency checks are sent from the production system to the quality system. Running the consistency checks at the production system can be complex and time consuming, which can affect usability of the production system. For instance, calculating whether the production system includes foreign key values for all records included in an update can result in a large number of database accesses and value comparisons.

Disclosed technologies provide improved methods for conducting consistency checks. In some aspects, the disclosed technologies can analyze update information to determine whether a consistency check is satisfied within the data to be transferred. That is, for example, if a value A of a Table 1 depends on a value B of a Table 2, no consistency check needs to be performed at the production system if value B in Table 2 is included in the data to be transferred as part of the update. Regardless of whether that data may currently exist at the production system, it will be preset after the update is imported, and thus the production system will be consistent as value A of Table 1 after the import.

In another aspect, values that should be present in the production system prior to import in order for consistency checks to be satisfied can be condensed and simplified, which can reduce the amount of data sent from the quality system to the production system, the amount and complexity of processing at the production system to carry out the consistency checks, and the amount of result data returned from the production system to the quality system.

Example 2

Example Change Request Between Database Systems

FIG. 1 illustrates a database environment 100 having a quality system 104 and a production system 106. The quality system 104 can be a system where changes to the production system 106 can be tested before being finally deployed to the production system. The production system 106 is typically used by end users, such as in the day-to-day operation of an entity.

Once updates have been appropriately tested in the quality system 104, they can be transported to the production system 106, such as in a change request 108. Change requests 108 can have a variety of implementations, but in a specific case can be implemented as a Transport Request, such as used in products of SAP SE of Walldorf, Germany. Transport Requests, or other types of change requests, can be managed by a change service, such as the Transport Management System of SAP SE of Walldorf, Germany. In other cases, change request 108 need not be centrally managed. For example, the production system 106 can include logic for reading and implementing instructions in a change request 108.

A change request 108 typically includes a plurality of changes. The changes may be to tables, such as table record changes 120 that add to, remove from, or modify one or more tables in the production system 106. In some cases, the table records changes 120 can be to standard or configuration tables. For instance, a particular software application, such as an ERP application or another application that might be used by an enterprise (e.g., for transaction processing, for manufacturing processes, supply chain management, human resources, etc.) might have standard tables, which may also have one or more standard values. As an example, a software application may use an employee table and a work location table. As described in Example 1, tables can be interrelated and such interrelations can be used to enforce data consistency. For instance, if an employee A is listed in the employee table as being employed in work location B (e.g., "shipping"), then work location B should exist in the work location table.

In at least some cases, the relationship between tables can be a foreign key relationship. In a foreign key relationship, one or more fields of a first table reference one or more fields of a second table that serve as a primary key for the second table. Thus, a particular foreign key value in the first table may not be unique in the first table, but is typically unique in the second table. Continuing the example above, multiple employees may be assigned to the "shipping" work location in the employee table, but "shipping" is typically a unique entry in the work location table. Because of this relationship, foreign keys typically serve as constraints in a database system. An error may be generated, for instance, if a database system determines that a value in the table with the foreign key does not correspond to a primary key value in the referenced table.

As an example of how problems can arise if inconsistencies are present, consider a JOIN operation between the employee table and the work location table. If the employee included a work location (say, "front desk"), that was not present in the work location table, the JOIN would fail to retrieve results, even though a user presumably intended data to be retrieved for employees listed as working at "front desk." In the absence of consistency checks and enforcements, erroneous results could unintentionally be provided, and data entry errors not caught (e.g., the work location table might use a different term for "front desk" and a user or process entering data would not be notified of the error absent the foreign key check).

A change request 108 can include one or more components. A change request 108, at least for purposes of disclosed technologies, typically includes the table record changes 120. Table record changes 120 can include adding or removing one or more tables, or making changes to an existing table. In some implementations, changing an existing table can be carried out by replacing all or a portion of a table, such as writing over a file that contains all or a portion (e.g., selected rows or columns) of a table, or opening a file and making various changes to the file contents. The updated file can then be loaded into memory for use in processing. In other cases, changes can be made to an in-memory version of a table or portion thereof, and optionally persisted.

In some aspects, changes to tables in the production system 106, including tables to be added or removed, or tables to be modified, can be carried out in conjunction with a RDBMS. For example, changes can be specified in a query language, such as SQL, or a programming language that can include query language instructions or can be translated into query language instructions, such as ABAP. Query language operations can specify whether to add or drop tables, add or remove fields, add or remove rows, or to update individual row elements (e.g., values for particular fields). Information sufficient to cause a change to table records can be included in the change request 108, or can be generated by the production system 106 in response to the change request. For instance, the production system 106 can analyze the change request 108 to determine what changes are needed, how they should be effectuated, and produce and execute suitable commands (e.g., SQL statements) to accomplish the changes.

The change request 108 can optionally include other information, such as schema changes 124 (e.g., to add or drop a table, to add or remove fields from a table, change table partitioning, or change other table metadata, such as descriptive information for a table). Configuration, or profile, information 128 can be included in a change request. The configuration information 128 can include information regarding, including identifying, one or both of the quality system 104 and the production system 106. The configuration information 128 can include one or more of version information (e.g., version information of various software components of the quality system 104 or expected to be present in the production system 106), frequency information (e.g., if the change request is recurring, and, if so, a frequency), and other system information, including system maintenance information. System information can include identifying computing nodes that should be used by the production system 106, credential information, or other types of configuration information.

The change request 108 can include installation instructions 132. Installation instructions 132 can, for example, specify how changes, including table record changes 120 and schema changes 124, should be made, including an order for such changes. That is, for example, a particular table record change may depend on another table record change or a schema change, such as updating a table to include a new primary key value before updating another table to include the value as a foreign key value.

One or more files 136 can be included in a change request 108. The files 136 can be new or updated software to be executed or installed on the production system 106, or particular software components or plugins. Information regarding how, and when, to install the files 136 can be included in the installation instructions 132. Change requests 108 can include one or more logs 140. Logs 140 can summarize information regarding various aspects of a change request 108, such as tables, or components (e.g., fields) thereof, affected by a change request. Logs 140 can include summaries of actions to be taken, and which can be assigned return values once the change request 108 is imported into the production system 106. Return values can include values, such as codes, indicating that an import action was successful, was successful but warnings were issued, warnings were issued and an action was not successful, or that an error occurred in the change request 108 that was not associated with a specific action or instruction.

The quality system 104 and the production system 106 can include a plurality of tables 150. A portion of the tables 150 can have identical schemas and identical values between the quality system 104 and the production system 106. For example, Table 1, 150a, has fields 156, 1-5, with three rows 158, having the same values 160 between the quality system 104 and the production system 106. In some cases, the table 150a can be omitted from the change request 108, as not having changed data or obvious schema changes. However, other types of schema changes, such as metadata descriptions of the table 150a may originally differ between the quality system 104 and the production system 106, until updated by the change request 108.

Table 2, 150*b*, differs between the quality system 104 and the production system 106. Typically, a table that differs between the quality system 104 and the production system 106 refers to a table that has one or both of different metadata or different values (e.g., records, or particular values of particular records). For example, table 150*b* has different values in the quality system 104 than in the production system 106, and table 150*c* has a different number of fields in the quality system than in the production system. However, in some cases a table that differs between the systems 104, 106 can be a table that exists in the quality system but not the production system, or which exists in the production system but not the quality system. As shown, the table 150*d* exists in the quality system 104, but is not included in the production system 106. The table 150*d* can be a table that is to be added to the production system 106 by being included as table record changes 120 (and possibly a schema change 124) of the change request 108.

As an example of how inconsistencies can arise as the result of applying a change request 108, a first version of the table 150*b*, located on the quality system 104, has the same fields as a second version of the table on the production system 106. However, the table 150*b* on the quality system 104 has a record (with Field 1="4") that is not present in the version on the production system 106. Assume that Field 1 of table 150*b* is a primary key, and that Field 1 of the table 150*a* of the quality system 104 is a foreign key that references Field 1 of table 150*b*. Accordingly, it can be seen that versions of tables 150*a* and 150*b* are consistent in the quality system 104, as the foreign key value of the table 150*b* exists as a primary key value in the table 150*a*. However, if only table 150*a* is updated in the production system 106, an inconsistency will arise because the foreign key value is not present as a primary key value in the table 150*b*.

Example 3

Example Data Structures

Figure 2A:
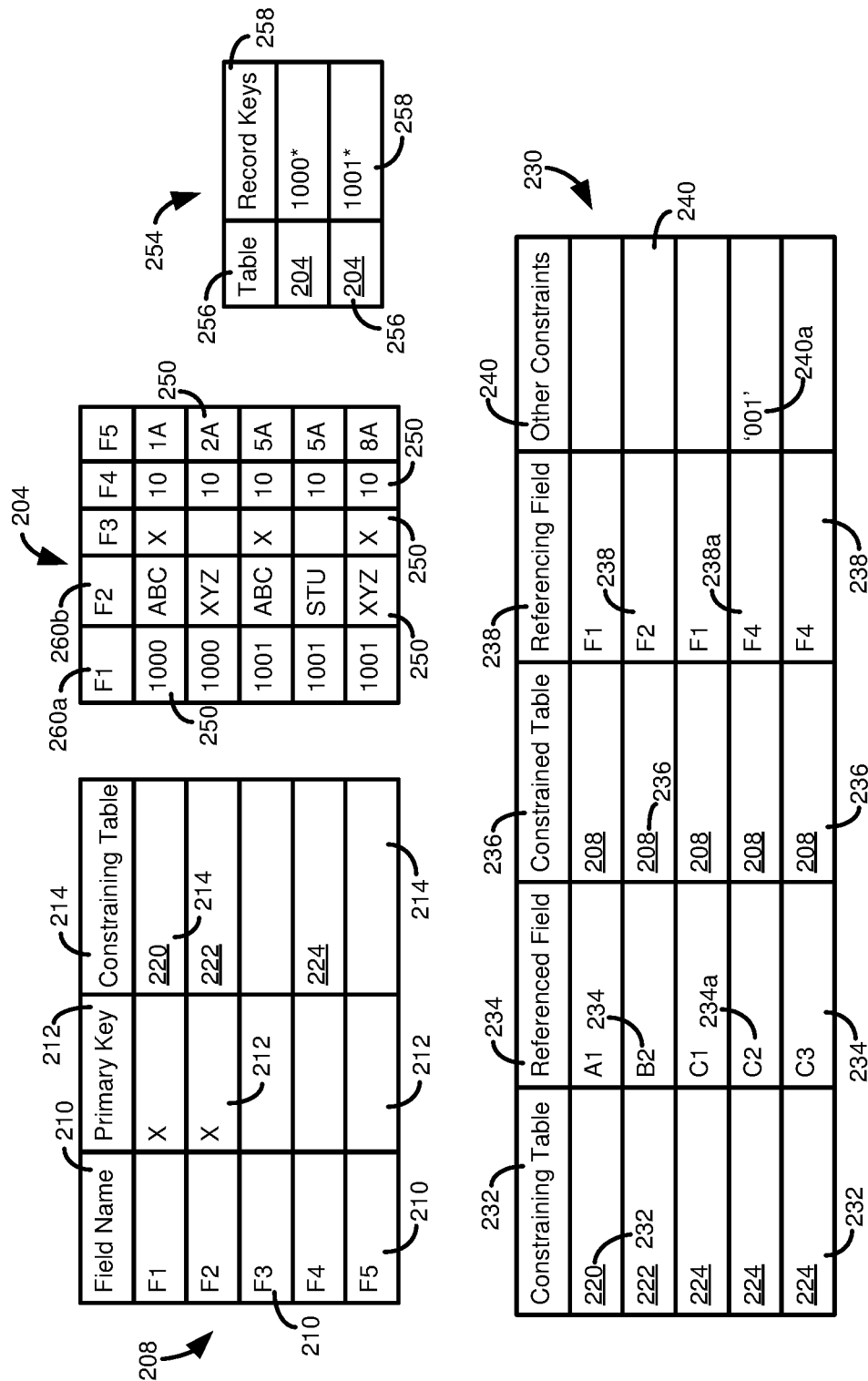

In particular embodiments, disclosed technologies can summarize table dependency information, such as foreign key relationships, in tables present in a quality system, where at least some of the table data is desired to be sent to a production system. With reference to FIG. 2A, schema data for a table 204 can be stored in a table 208. The table 208 includes a column providing field names 210 for the various fields of table 204. The table 208 further includes a column providing a flag 212 or other indicator of whether the corresponding field (e.g., in the same row or tuple) serves as a primary key, alone or in conjunction with other fields of the table 204.

As shown, a value of 'X' (or TRUE, 1, etc.) can be used for the flag 212 to indicate the that field name 210 of the current tuple is, or is part of, a primary key for the table 204. No value being present for the flag 212 (or a value of FALSE, 0, etc.) can indicate that the corresponding field name 210 is not, or is not part of, a primary key for the table 204. The table 208 can include a column providing a constraining table indicator 214, indicating whether the corresponding field 210 is constrained by one or more other tables, such as having a foreign key relationship, or another association (e.g., to a table field that does not serve as a primary key for that table) to another table. If a constraining table exists, the indicator 214 can include a value that serves as an identifier for, and can be used to access, such other table. A value not being present for the constraining table indicator 214 can indicate that the particular field name 210 associated with the current tuple is not constrained by another table.

From Table 208, it can be seen that fields F1 and F2 are both part of a primary key for the table 204, but that field F1 is constrained by a table 220 while the field F2 is constrained by a table 222. Field F4 is not part of a primary key of Table 204, but is constrained by a table 224.

In some cases, the table 208 identifies when a field of the table 204 is constrained by another table, and optionally an identifier of such table. However, the table 208 may not indicate which field of the constraining table is referenced by the constrained field of the constrained table. Such information can be maintained in a table 230, which can maintain such information for a single table or for plurality of tables, such as all tables associated with a particular database or database schema. That is, the table 230 is shown as maintaining information for a plurality of tables, including tables 204 and tables 220, 222, 224, but could include information for fewer tables, including for a single table. In particular implementations, the table 230 can be, or be part of, a data dictionary or an information schema.

Table 230 has a constraining table attribute 232 indicating the name of a table which is constrained by the constraining table of the tuple. A referenced field attribute 234 indicates the name of a field of the constraining table that serves to constrain a field of the constrained table. A constrained table attribute 236 indicates the name of the table that is constrained by the constraining table attribute 232 of the current tuple. A referencing field attribute 238 indicates the name of the field of the constrained table that is constrained by the referenced field of the constraining table.

The table 230 can have an "other constraints" attribute 240 indicating other constraints that may be placed on a particular referenced field (and thus by relation on a referencing field). For instance, referenced field 234*a* is associated with a value of '001' for the "other constraints" field 240*a*. Thus, the value of the other constraints field 240*a* indicates the referencing field 238*a* is constrained to values of '001.' Referencing field 238*a* is not constrained by whether a particular value exists in referenced field, but whether a condition, which can be a composite condition that includes additional conditions for other referenced fields 234, includes '001' as a value in the constraining field 234*a*. Referenced field 234*a*, table 208 may be constrained to only include values for field F4 where corresponding values exist in fields C1 and C3 of table 224, and where field C2 of Table 224 has a value of '001.' Note that fields C1, C2, and C3 may serve as a composite primary key for the table 224, whereas tables 220 and 222 have a primary key formed from a single table attribute of their respective tables.

Other possible values of the other constraints attribute 240 can be a wildcard value (e.g., "*") or rules to determine whether a value (or collection of values, such as a composite value produced from multiple fields) satisfies a rule. For instance, a rule can be to check whether a value has a correct datatype, is within a certain range, is higher or lower than a threshold value, includes or does not include certain values, or has a correct length or formatting. As an example, it may be desirable to determine that a value corresponds to a phone number, but all possible phone number may not be known. Determining that a value consists of a series of 10 integers between 0 and 9 may be a condition useable to determine that a number satisfies a rule for a phone number.

To illustrate how the tables 208, 230 can be used, the table 204 is a particular instance of the table schema 208 is shown, having values 250. An update request table 254 can include a table identifier 256 indicating records to be included in an update, and a record key identifier 258 that specifies particular table records (e.g., primary key values) to be included in the update. Recall that in table 208 fields F1 and F2, corresponding to fields 260a, 260b of the instance 204, serve as a composite primary key. Thus, the values for the record key identifier 258 in the table 254 specify that any records having a value that begins with "1000" or with "1001" will be included in the update request.

Results of applying the constraints of the table 230 to the values 250 of the instance 204 are shown in Table 272 of FIG. 2B. Table 272 includes a constrained table identifier attribute 274 identifying a constrained table, a record key identifier attribute 276 associated with the particular tuple (and, in the case of an update request, which corresponds to the records to be included in the update request as specified in the table 254 of FIG. 2A, a field name identifier attribute 278, corresponding to a constrained field of the instance 204, a field value attribute 280 associated with the field name attribute 278 for the particular tuple taken from the instance 204, a constraining table identifier attribute 282 identifying a particular table that serves to constrain the field associated with the particular tuple and the constrained table identified by the constrained table attribute 274, and a condition attribute 284 to be satisfied for the respective tuple. A value of the condition attribute 284 can be constructed from the constraints of the table 230 and the values 250 of the instance 204.

All or a portion of the table 272 can be sent to a production system, such as from a quality system, to determine whether the conditions 284 are satisfied prior to taking further steps to send and apply an update request to the production system. For instance, the conditions 284 alone can be sufficient for consistency checks to be conducted, where results can be recorded, at least a portion of the results sent from the production system to the quality system, and the results associated with particular conditions 284. Sending at least the conditions 284 can be advantageous compared with prior approaches for carrying out consistency checks associated with an update. For example, sending the conditions 284 can result in less data being transferred between the quality and production systems, as entire records need not be sent between the quality and production systems. That is, while the conditions 250 include at least some of the values 250, they do not include all of the values, such as values for fields 210 that are not associated with a constraint. Thus, even for the simple example of FIG. 2, less computing resources are needed to transfer information between the quality and production systems. In actual database systems, an instance of a table may have tens or hundreds of fields, and may have thousands or millions of rows, and thus the disclosed technologies can realize significant computer resource savings.

The conditions 284 can also be easier for the production system to test, thus resulting in less computer resource use at the production system, and less logic being needed. That is, the production system need only test or execute a given condition; it need not determine the condition. Accordingly, update processes of the present disclosure can interfere less with normal operation of the production system, reducing any performance impact on end users.

Steps can be taken to further reduce the resources used by disclosed conditions 284. For instance, it can be seen that, while individual tuples of the table 272 are unique, all of the conditions 284 are not. For instance, conditions 284a and 284b are identical, as are conditions 284c-284e. Conditions 284f and 284i are identical, as are conditions 284g and 284j. Conditions 284k and 284l represent a single unique condition, as do conditions 284m-284o. As long as any of a set of identical conditions 284 is satisfied, then all members of the set will be satisfied, regardless of other differences that may exist between tuples of the table 272 or the tuples of the instance 204.

Accordingly, disclosed technologies can include a duplicate constraint or condition removal process. After removing duplicate constrains or conditions, and information not needed for evaluating consistency, the table 290 of FIG. 2C can be produced. The table 290 includes a column that lists values for constraining table identifiers 292 and a column that includes conditions 294 to be tested. The table 290 can be sent to a production system and the conditions 294 evaluated.

Although the conditions 294 in table 290, and in other tables of FIGS. 2A-2C, are shown as particular field identifiers, particular values, and particular operators (e.g., "="), the conditions can be specified in another manner, and can be included in a table, such as the table 290, or maintained in another format. In a particular example, the conditions 294 can be expressed in a query language (or another language, such as ABAP, in which query language operations can also be specified), such as a SQL SELECT statement for the relevant constraining table 292, field name, and field value. Taking condition 294a as an example, a SELECT statement can be "SELECT * FROM 220 WHERE A1='1000';". If results are returned, then the condition can be indicated as satisfied, whereas no results can indicate that the condition is not satisfied (and thus an inconsistency may exist if the update is sent to the target system). As shown, a condition 294 with multiple constraints can include operators, such as Boolean operators, for the constraints, but can also can include other mathematical or logical operators or comparators (e.g., <, >, <=, >=, =, and the like).

However, other types of query language statements can be used. Another example query language statement is, in ABAP:

```
SELECT SINGLE @abap_true FROM (check_table)
    INTO @DATA(lv_exists) WHERE (check_condition)
```

Where "SELECT SINGLE @abap_true" selects a Boolean value ('X' if true, and "NULL" or no value if false) for the lv_exists variable, "check_condition" is the current condition being evaluated (e.g., "A1='1000'"), and check_table is the constraining table where the check condition is being evaluated. The lv_exists variable can then be assigned as a return value for the particular condition, such as being assigned to a return value table 296.

Results can be returned from the production system to the quality system, such as in the form of the table 296, which can be identical to the table 290 except that the results table also includes a column for storing consistency check results 298 (e.g., TRUE or FALSE, YES or NO, "X" or " ", etc.).

The use of the table 290 can thus even further reduce computing resource use, as less data need be sent between a quality system and a production system, and fewer queries and calculations need be executed by the production system in evaluating consistency conditions.

Example 4

Example Consistent Check Operations

Figure 3:
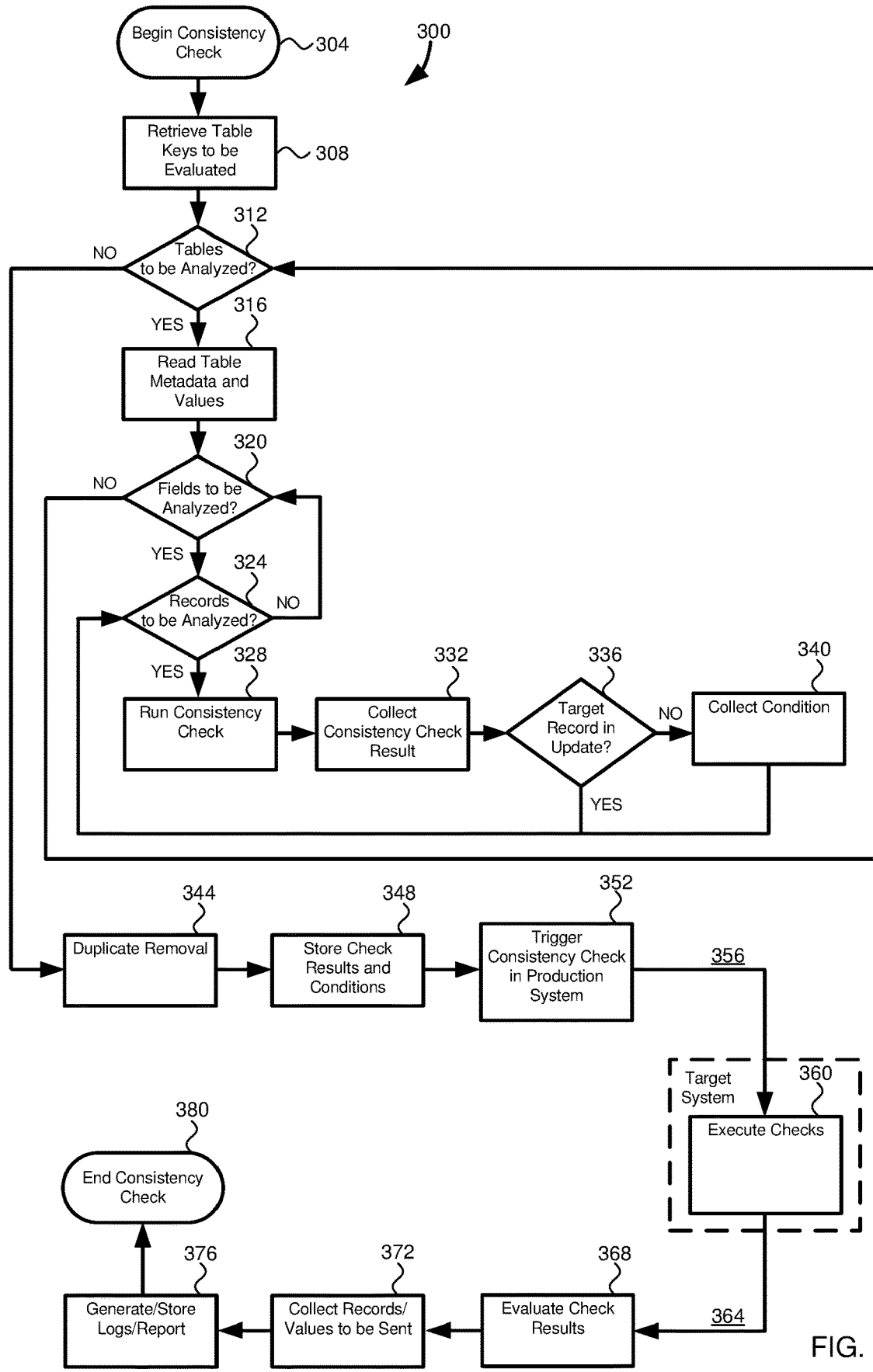
FIG. 3 is a flowchart illustrating operations for carrying out a consistency check.

FIG. 3 is a flowchart depicting operations in a method 300 for performing consistency checks before an update is sent, or applied, to a database system. The method 300 can be implemented in the database environment 100 of FIG. 1, and can include the data structures (e.g., tables) depicted in FIGS. 2A-2C.

The consistency check beings at 304. In some cases, a consistency check beginning at 304 can include receiving an identifier of an update request to be evaluated, where the update request includes records from one or more tables to be sent from a source system (e.g., a quality system) to a target system (e.g., a production system). In some cases, the method 300 can be implemented in conjunction with an API, where a call to the API includes an identifier of an update request for which consistency checks are to be performed.

At 308, table keys to be evaluated are retrieved. For instance, the table keys can be retrieved from an update specification, such as from a table having the form, or the information contained in, table 254 of FIG. 2A. The table keys retrieved at 308 thus specify what tables are involved in a consistency check, as well as particular rows or tuples of such tables, and thus particular values that should be checked for consistency.

At 312, it is determined if additional tables remain to be analyzed in the consistency check. If additional tables remain, the method 300 proceeds to 316, and, if not, to 344, as will be further described. For a selected table of the remaining tables to be analyzed, table metadata and metadata values are read at 316, such as from a data dictionary or information schema. Reading metadata and metadata values at 316 can include determining whether the table has any constrained fields, and, if so, determining one or more conditions associated with the constrained field. Reading metadata and values at 316 can include reading information from a table having a form similar to the table 208 or the table 230 of FIG. 2A.

At 320, it is determined if any constrained fields remain to be analyzed of the table currently being analyzed. If not, the method 300 can return to 312. Otherwise, the method 300 proceeds to 324, where it is determined whether, for a current field being analyzed, any records remain to be analyzed. If no records remain to be analyzed for the current field, the method 300 can return to 320. Otherwise, the method 300 gets a next record and proceeds to carry out a consistency check for the record at 328. Carrying out the consistency check at 328 can include determining whether a constraining field of a constraining table, or another constraint or condition, that constrains the field currently being analyzed has a value consistent with a value of the record currently being analyzed. In a particular implementation, carrying out the consistency check can include executing a SQL SELECT statement for the value in the table being analyzed, such as SELECT * FROM CONSTRAINING_TABLE WHERE CONSTRAINING_FIELD='Value'.

A result of the consistency check, which can include an identifier of the constraining table and a value associated with a constraining field of the constraining table, can be collected at 332. For example, it can be determined whether a SELECT statement executed at 328 returns one or more records. At 336, it is determined whether the target record (e.g., a tuple of the constraining table having the value required for the consistency check) is present in an update request. If the target record is not present, a condition is collected at 340, and the method 300 can return to 324. The collected condition can have the form of a row of table 272 of FIG. 2B. If the target record is determined at 336 to be present, no additional action needs to be taken, as, even if a target system (e.g., a production system) does not currently include a value needed for consistency, the target system will include such value after the update is processed. In such case, the method 300 can proceed from 336 to 324.

After it is determined at 312 that all tables (at least those having one or more constraints) have been processed, the method proceeds to 344, where duplicates can be removed from the collected check conditions. 344 can also include simplifying the check conditions, such as by summarizing information for a check condition as a constraining table and one or more field values for a constraining field of the constraining table. The result of the processing at 344 can be a table having the form of table 290 of FIG. 2C, which table can be stored at 348. The conditions stored at 348 (or the set of conditions collected at 340) can be considered as intermediate results, and can represent processing that can be performed by the source system (e.g., the quality system) that need not be carried out by the target system (e.g., the production system), in addition to being in a form that requires less computing resources to send and process.

A consistency check request can be generated at 352 and sent to a target system in a communication 356. The consistency check request can include consistency checks to be carried out, including in the form of the table 290 or the table 296 of FIG. 2C. The consistency checks are executed in the target system at 360. Execution of the consistency check at 360 can include storing an indication of whether the check was successful, such as by placing an entry in a table having the form of table 296 of FIG. 2C. Consistency results can be sent from the target system to the source system (e.g., a quality system) in a communication 364.

The consistency results are evaluated at 368. Evaluating the consistency results at 368 can include identifying consistency check failures, and determining table, or records thereof (or individual attribute values thereof), that should be sent to the target system in order for the target system to be consistent after an update is applied. The records can be collected at 372. In other aspects, records (or missing values) can be identified and sent to the target system to be created. That is, in some cases, permissions or other types of configuration settings or considerations may be such that data should be created or modified directly at the target system, rather than being included in an update.

As an example, the update may primarily update standard tables associated with an application, while the inconsistency may result from tables that are associated with particular end users. In some cases, an administrator of the production system causes the necessary data to be generated, or changed, in a target system. In other cases, a call, such as a remote function call or API, can be made by the source system to the target system to make appropriate changes to the target system before the update is sent. In yet further examples, rather than creating data in a constraining table, values of the constrained table can be modified to be consistent with the constraining table. For instance, if an employee is attempted to be assigned to a department that does not exist, the department can either be created in the constraining table, or the employee can be assigned to a department that is present in the constraining table. In some cases, a user can be presented with suggested or available options for changing a value in a record of a constrained table to be consistent with a constraining table, including through the use of machine learning or semantic analysis.

A log can be generated, and optionally stored, at 376. The log can include a table having the form of table 296 of FIG. 2C, or otherwise include information regarding at least failed consistency checks. When actions are automatically taken to fix a failed consistency check, such as collecting records at 372, such actions can also be included in a log. The consistency check method 300 can end at 380.

It should be appreciated that changes can be made to the method 300 without departing from the scope of the present disclosure. For example, one or more of evaluating consistency results at 368, collecting records at 372, or generating a log at 376 can be omitted. Although consistency checks are shown as being carried out on a record-by-record and field-by-field basis based on the determining at 320 and at 324, in other cases, consistency checks can be run at 328 for all fields of a particular row, or for all implicated fields and rows for a particular table. Consistency checks for particular tables, fields, or records can also be parallelized, if desired.

In the discussion of 328, 332 is assumed that the consistency check is satisfied for the source (e.g., quality) system. That is, typically, prior to 304, consistency checks are executed in the source system, and any corrections are made prior to determining whether sending the update to a target system will cause inconsistencies. However, steps can be included in the method 300 to account for situations where consistency checks were not previously executed in the source system, or where data in the source system may have changed since a consistency check was carried out. For instance, if a consistency result 332 is that a condition being tested is not satisfied at the source system, the consistency failure can be logged, and flagged for review. After the inconsistency has been addressed (e.g., by adding a value to a constraining table corresponding to a foreign key value or by changing a foreign key value of a constrained table to a value that is present in a constraining table), the consistency check for the particular record can be re-executed and the method 300 can proceed to 336. Note that processing of records that initially failed a consistency check at 332 can be processed without having to reprocess all of the records in an update, in at least some implementations of disclosed technologies.

In some cases, the operations 328, 332 can be omitted. In some cases, the operations 328, 332 can represent a consistency check at the source system. Such checks need not always be carried out, including if consistency checks at the source system were already carried out prior to 300, or if consistency checks are otherwise not needed or desired. In such an implementation, values associated with the records analyzed at 324 can analyzed to see if they are in the update, and collected as conditions at 340 if not.

Note that while the present disclosure generally describes determining whether an update to a constrained table will produce a consistency violation, the disclosed techniques can be applied in a similar manner to determine whether changes to a constraining table will result in violations when applied to a target database system. For instance, an update may alter a table that is referenced by one or more tables through a foreign key relationship or other association. If the update removes a value from the constraining table that is present in a constrained table of the target system, a consistency violation can occur. Such conditions can be tested in a similar manner as for changes to constrained tables, such as by generating a test condition to determine whether a removed value exists at the target system. The test condition can include an identifier of one or more constrained tables, identifiers of one or more constrained fields, and values to be checked. If a value is present in the target database system, a consistency violation can be indicated. In a similar manner as 336, if values of the constrained tables are removed in the update, the test condition need not be generated.

Example 5

Example Embodiments

FIG. 4 is a flowchart of an example method 400 of operations that can be carried out by a first database system to perform a consistency check with respect to a second database system. The method 400 can be implemented using the database environment 100 of FIG. 1, and can include data structures shown in FIGS. 2A-2C. At 404, at least a first table updated at the first database system is determined. The first table is a constrained table. At least one field of a constraining table is determined, at 408, that constrains at least a first field, a constrained field, of the at least a first table.

At 412, values of the constrained field in records of the at least a first table are determined. A plurality of test conditions are generated at 416, at least for unique values of the determined values. At 420, the plurality of test conditions are sent to the second database system. Test results are received from the second database system at 424. At 428, an update is sent from the first database system to the second database system based at least in part on the received test results. The update includes at least a portion of values of the at least a first table.

FIG. 5 is a flowchart of an example method 500 of operations that can be carried out by a second database system to perform a consistency check with respect to an update associated with a first database system. The method 500 can be implemented using the database environment 100 of FIG. 1, and can include data structures shown in FIGS. 2A-2C. At 504, a plurality of test conditions are received by the second database system from the first database system. A test condition specifies at least one constraining table, at least one constraining field of the at least one constraining table, and at least one value for the at least one constraining field. The first database system does not send with the test condition values of a constrained table of the first database system that are not used in a test condition.

The plurality of test conditions are executed at 508 to produce test results, the test results indicating whether the plurality of test conditions succeeded or failed. At least a portion of the test results are sent from the second database system to the first database system at 512. At 516, an update is received from the first database system, where the update includes at least one update value referencing a test value associated with at least one of the plurality of test conditions (e.g., the update includes a record having a foreign key value that references a primary key value of the second database system, the primary key value being tested for earlier, during execution of the test condition). The update is applied at 520, including, for a table of the second database system, adding or modifying at least one table value with the update value.

Figure 6:
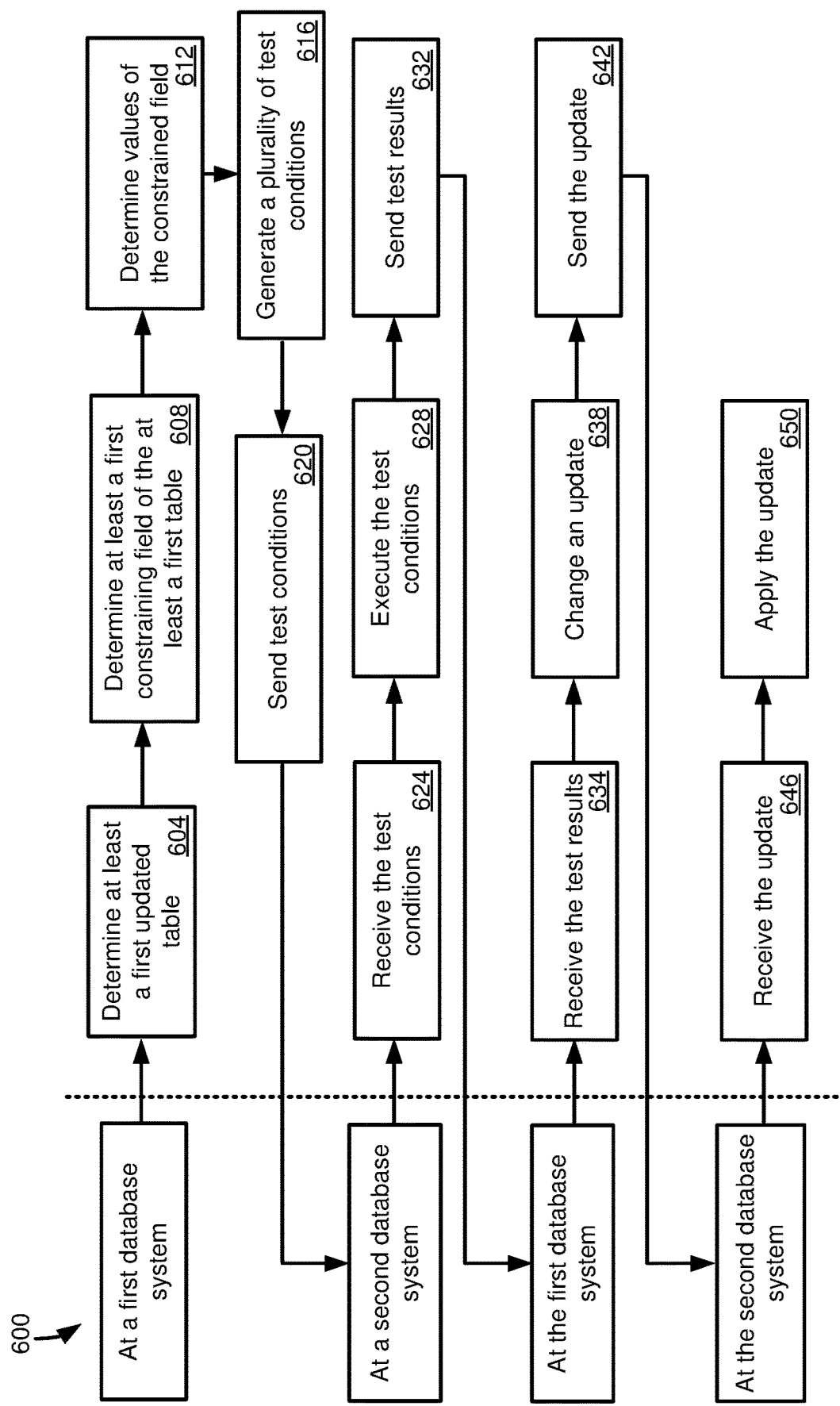
FIG. 6 is a flowchart illustrating operations that can be carried out by first and second database systems during a consistency check.

FIG. 6 is a flowchart of an example method 600 of operations that can be carried out by a first database system and a second database system to perform a consistency check. The method 600 can be implemented using the database environment 100 of FIG. 1, and can include data structures shown in FIGS. 2A-2C. At the first database system, at 604, at least a first table to be updated at the first database system is determined. The at least a first table is a constrained table. At 608, at least a first constraining field of a constraining table that constrains at least a first field, a constrained field, of the at least a first table is determined. A plurality of test conditions are generated at 612, at least for unique values of the determined values. At least a portion of the test conditions are sent by the first database system to the second database system at 616.

At the second database system, a plurality of test conditions are received from the first database system at 620. A test condition specifies at least one constraining table, at least one constraining field of the at least one constraining table, and at least one value for that at least one constraining field. The first database system does not send with the test condition values of a constrained table of the first database system that are not used in a test condition. At 624, the plurality of test conditions are executed to produce test results, indicating whether the plurality of tests succeeded or failed. At least a portion of the test results are sent to the first database system at 628.

At the first database system, test results are received from the second database system at 632. At 636, one or more changes are made to an update to be sent to the second database system based at least in part on the test results. The update is sent to the second database system at 640, where the update includes at least one update value referencing a test value associated with at least one of the plurality of test conditions.

At the second database system, at 646, the update is received from the first database system. The update is applied at 650, which includes, for a table of the second database system, adding or modifying at least one table value with the update value.

Example 6

Computing Systems

Figure 7:
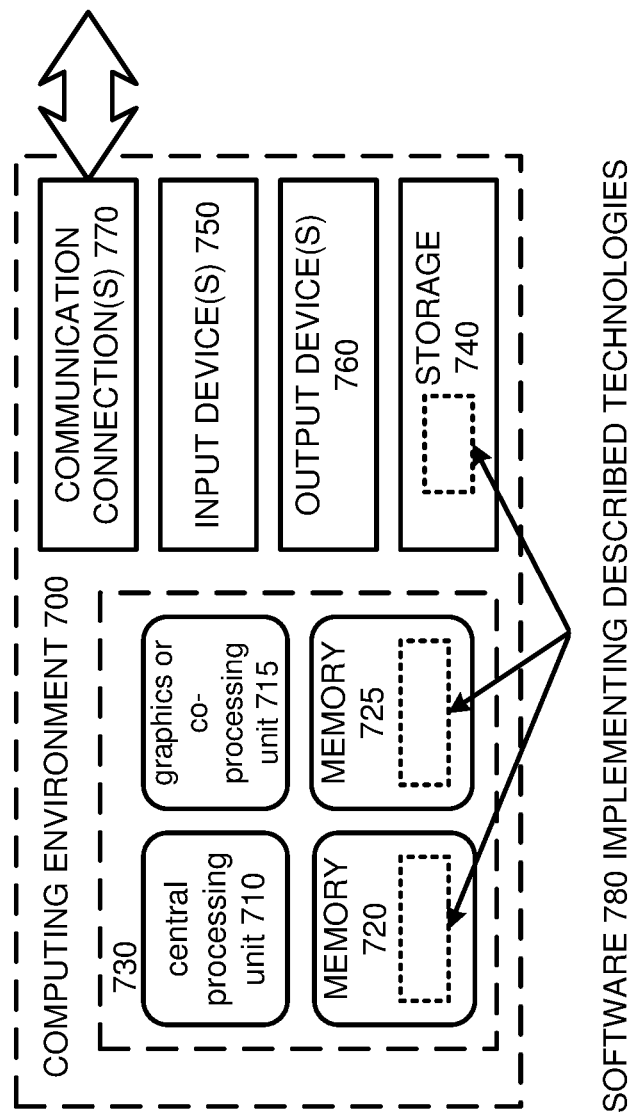
FIG. 7 is a diagram of an example computing system in which some described embodiments can be implemented.

FIG. 7 depicts a generalized example of a suitable computing system 700 in which the described innovations may be implemented. The computing system 700 is not intended to suggest any limitation as to scope of use or functionality of the present disclosure, as the innovations may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions, such as for implementing components of the architecture 100 of FIG. 1, including as described in Examples 1-5. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s) 710, 715. The memory 720, 725 stores software 780 implementing one or more innovations described herein, in the form of computer-executable instructions suitable for execution by the processing unit(s) 710, 715.

A computing system 700 may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing system 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 7

Cloud Computing Environment

Figure 8:
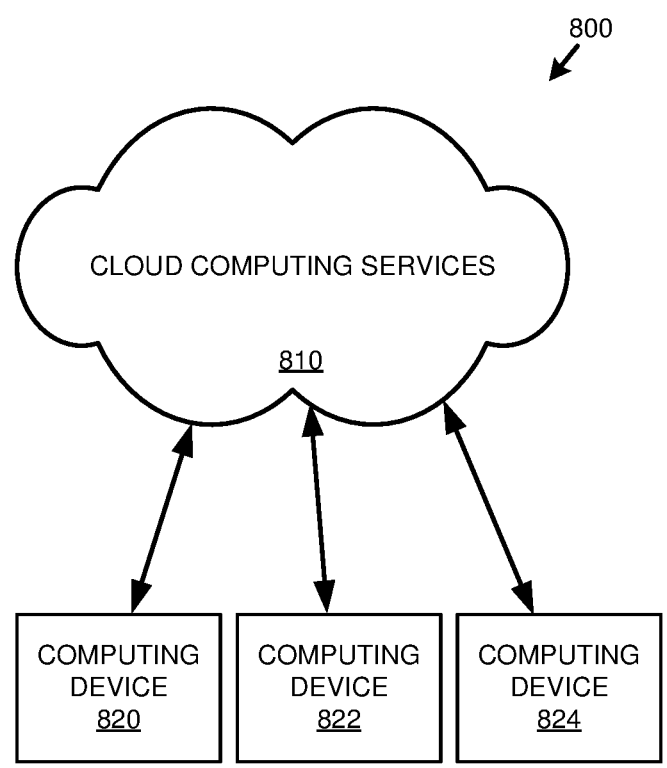
FIG. 8 is an example cloud computing environment that can be used in conjunction with the technologies described herein.

FIG. 8 depicts an example cloud computing environment 800 in which the described technologies can be implemented. The cloud computing environment 800 comprises cloud computing services 810. The cloud computing services 810 can comprise various types of cloud computing resources, such as computer servers, data storage repositories, networking resources, etc. The cloud computing services 810 can be centrally located (e.g., provided by a data center of a business or organization) or distributed (e.g., provided by various computing resources located at different locations, such as different data centers and/or located in different cities or countries).

The cloud computing services 810 are utilized by various types of computing devices (e.g., client computing devices), such as computing devices 820, 822, and 824. For example, the computing devices (e.g., 820, 822, and 824) can be computers (e.g., desktop or laptop computers), mobile devices (e.g., tablet computers or smart phones), or other types of computing devices. For example, the computing devices (e.g., 820, 822, and 882) can utilize the cloud computing services 810 to perform computing operators (e.g., data processing, data storage, and the like).

Example 8

Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 7, computer-readable storage media include memory 720 and 725, and storage 740. The term computer-readable storage media does not include signals and carrier waves. In addition, the term computer-readable storage media does not include communication connections (e.g., 770).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The disclosed technology is not limited to any specific computer language or program. For instance, the disclosed technology can be implemented by software written in C, C++, C#, Java, Perl, JavaScript, Python, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
one or more memories;
one or more hardware processing units coupled to the one or more memories; and
one or more computer readable storage media storing instructions that, when executed, cause the computing system to perform operations comprising:
determining at least a first constrained table updated at a first database system, wherein the at least a first constrained table comprises at least a first constrained field, wherein in the constrained table, values of the at least a first constrained field are constrained by values of one or more constraining fields of a constraining table in the first database system;

determining at least a first constraining field of the one or more constraining fields of the constraining table;

determining values of the constrained field in records of the at least a first constrained table;

generating a plurality of test conditions, wherein the plurality of test conditions are created for unique values of the values of the constrained field in records of the at least a first constrained table;

sending at least a portion of the plurality of test conditions to a second database system to be executed at the second database system, wherein the second database system is different than the first database system;

receiving test results from the second database system;

sending an update to the second database system based at least in part on the received test results, wherein the update comprises at least a portion of values of the at least a first constrained table; and determining that a first value of the constrained field has already been analyzed, wherein a duplicate condition is not generated for the first value.

2. The computing system of claim 1, wherein test conditions are generated for duplicate values of the constrained field, the method further comprising:

analyzing the test conditions for duplicate conditions;

determining that a first condition is duplicative of a second condition; and removing the second condition from a set of conditions to be sent to the second database system.

3. The computing system of claim 1, the operations further comprising:

determining that a second value of the constrained field has already been analyzed;

in response to determining that the second value of the constrained field has not been analyzed, generating a test condition for the second value.

4. The computing system of claim 1, wherein at least one of the test conditions is implemented using a query language statement comprising a SELECT operation.

5. The computing system of claim 1, wherein at least one of the test conditions comprises:

an indicator of the constraining table;

an indicator of the constraining field; and at least one value of the constraining field.

6. The computing system of claim 1, wherein at least one constrained field of the first table is constrained by multiple constraining fields of the constraining table and wherein a test condition comprises a relationship between values of the constraining fields.

7. The computing system of claim 6, wherein the relationship is expressed using at least one Boolean operator.

8. The computing system of claim 1, wherein at least one constrained field is constrained by a constant value or a wildcard.

9. The computing system of claim 1, wherein the first table further comprises at least a second constrained field, wherein the at least a second constrained field is further constrained by at least one constant value or at least one wildcard.

10. The computing system of claim 9, wherein the at least a second constrained field is not constrained by a constraining field of the constraining table.

11. The computing system of claim 1, the operations further comprising:

determining that a second value of the constrained field is present in at least a second table to be updated at the second database system; and in response to determining that the second value of the constrained field is present in the at least a second table, not generating a test condition for the second value.

12. The computing system of claim 1, wherein sending the update comprises sending at least a portion of a plurality of tables, each with a plurality of records having values for a plurality of fields, from the first database system to the second database system.

13. The computing system of claim 12, wherein at least a portion of the update is implemented as query language operations to add, remove, or update values of one or more tables of the second database system.

14. The computing system of claim 1, wherein determining at least a first constraining field comprises analyzing a data dictionary entry for the at least a first table.

15. The computing system of claim 1, the operations further comprising:

determining that test results received from the second database system indicate that a value of the constraining table is not present in the second database system; and including the value of the constraining table that is not present in the second database system in the update.

16. The computing system of claim 1, the operations further comprising:

determining that test results received from the second database system indicate failure of a test condition, the failure indicating that a value of the constraining table is not present in the second database system; and providing a notification to a user of the failure.

17. The computing system of claim 1, the operations further comprising:

determining that test results received from the second database system indicate that a value of the constraining table is not present in the second database system; and generating a command to cause the second database system to add the value to the second database system.

18. The computing system of claim 1, wherein:

(1) test conditions are generated for duplicate values of the constrained field;

(2) the determining that a first value of the constrained field has already been analyzed comprises analyzing the test conditions for duplicate conditions and determining that a first condition is duplicative of a second condition; and (3) not generating a duplicate condition for the first value comprises removing the second condition from a set of conditions to be sent to the second database system.

19. One or more non-transitory computer-readable storage media comprising:

computer-executable instructions that, when executed by a computing system comprising at least one hardware processor and at least one memory coupled to the at least one hardware processor, cause the computing system to receive a plurality of test conditions from a first database system, wherein a given test condition of the plurality of test conditions specifies (1) at least one constraining table, (2) at least one constraining field, and (3) at least one test value for the at least one constraining field, wherein the at least one constraining table comprises the at least one constraining field, wherein in the constraining table, the at least one test value for the at least one constraining field constrains at least one value for at least one constrained field of a second table of the first database system, the second table being a constrained table comprising the at least one constrained field, and wherein the first database system does not send with the plurality of test conditions values of the constrained table of the first database system that are not used in the plurality of test conditions;

computer-executable instructions that, when executed by the computing system, cause the computing system to execute the plurality of test conditions to produce test results indicating whether the plurality of tests succeeded or failed;

computer-executable instructions that, when executed by the computing system, cause the computing system to send at least a portion of the test results to the first database system;

computer-executable instructions that, when executed by the computing system, cause the computing system to receive an update from the first database system, the update comprising at least one update value referencing a test value associated with at least one of the plurality of test conditions;

computer-executable instructions that, when executed by the computing system, cause the computing system to apply the update, the applying the update comprising, for a table of a second database system, adding or modifying at least one table value with the update value, wherein the second database system is different than the first database system; and computer-executable instructions that, when executed by the computing system, cause the computing system to determine that a first value of the constrained field has already been analyzed, wherein a duplicate condition is not generated for the first value.

20. A method, implemented by a computing system comprising at least one hardware processor and at least one memory coupled to the at least one hardware processor, the method comprising:

at a first database system:
determining at least a first constrained table updated at a first database system, wherein the at least a first constrained table comprises at least a first constrained field, wherein in the constrained table, values of the at least a first constrained field are constrained by values of one or more constraining fields of a constraining table in the first database system;

determining at least a first constraining field of the one or more constraining fields of the constraining table;

determining values of the constrained field in records of the at least a first constrained table;

generating a plurality of test conditions, wherein the plurality of test conditions are created for unique values of the values of the constrained field in records of the at least a first constrained table; and sending at least a portion of the plurality of test conditions to a second database system to be executed at the second database system;

at a second database system, the second database system being different from the first database system:
receiving the at least a portion of the plurality of test conditions from the first database system, the plurality of test conditions specifying at least one constraining table, at least one constraining field of the at least one constraining table, and at least one value for the at least one constraining field, wherein the first database system does not send with the plurality of test conditions values of a constrained table of the first database system that are not used in the plurality of test conditions;

executing the plurality of test conditions to produce test results indicating whether the plurality of tests succeeded or failed;

sending at least a portion of the test results to the first database system;

at the first database system:
receiving the at least a portion of the test results from the second database system;

making one or more changes to an update to be sent to the second database system based at least in part on the test results; and sending the update to the second database system, wherein the update includes at least one update value referencing a test value associated with at least one of the plurality of test conditions; and at the second database system:
receiving the update from the first database system; and applying the update, the applying the update comprising, for a table of the second database system, adding or modifying at least one table value with the update value.

* * * * *